Figure 1:
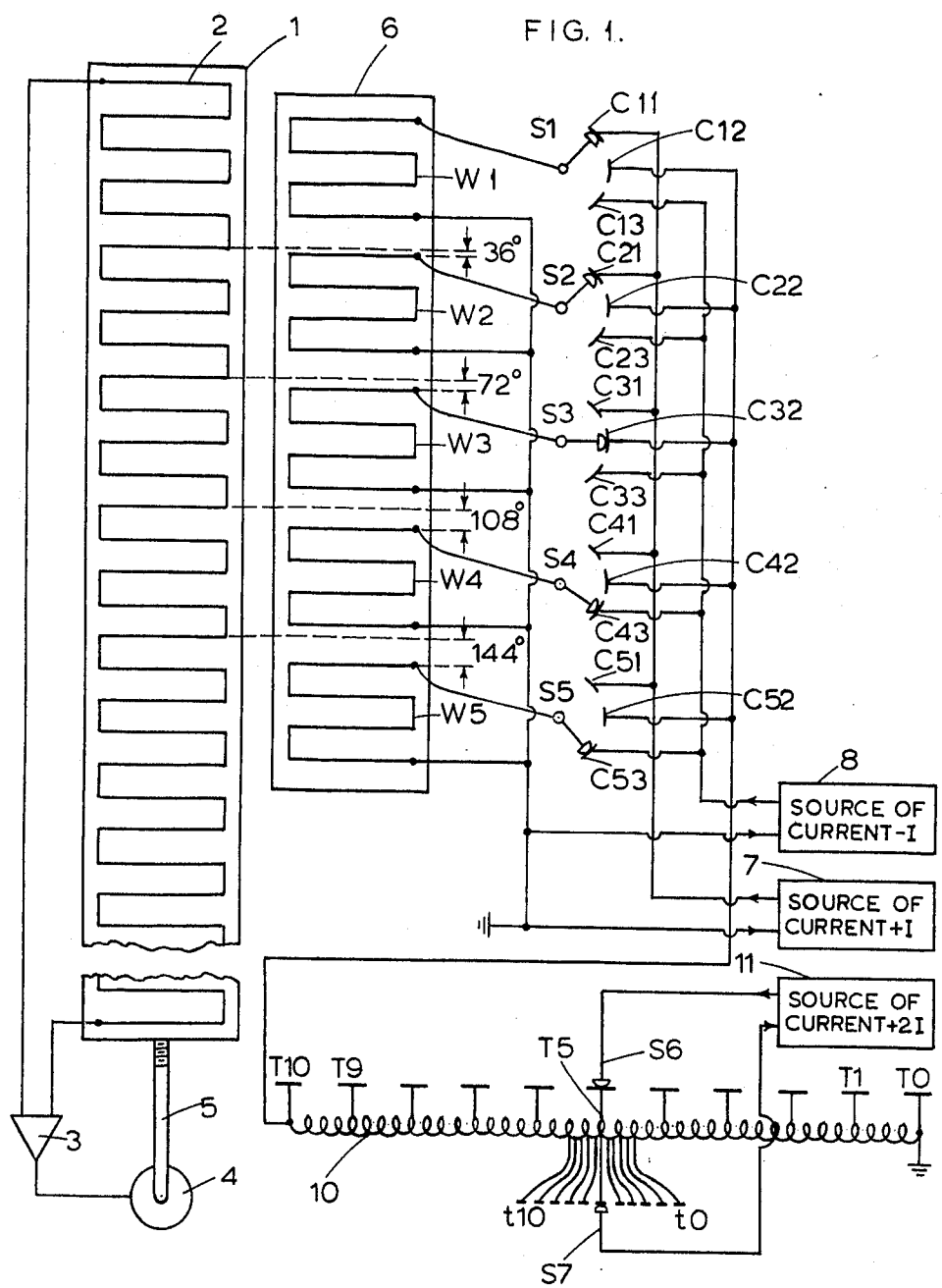

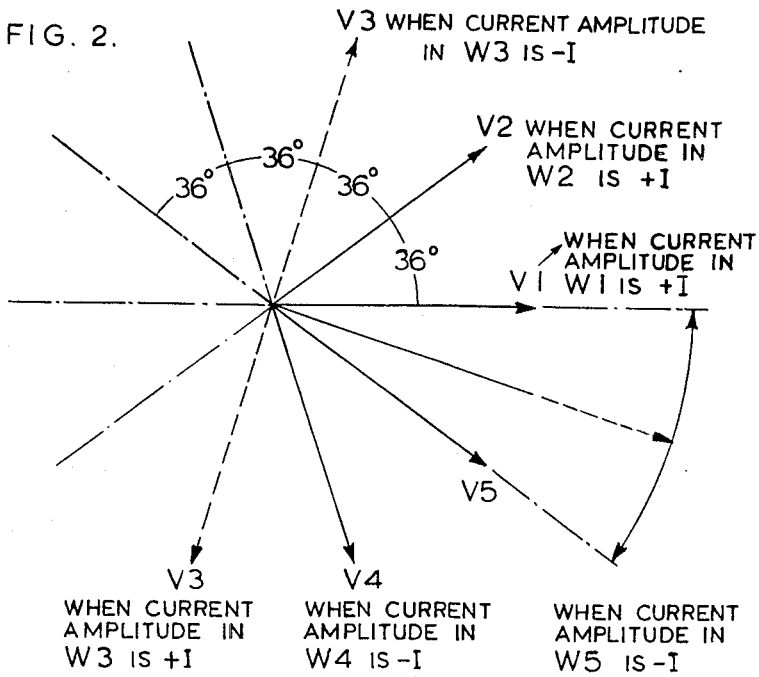

United States Patent Office 3,235,781
Patented Feb. 15, 1966

3,235,781
DISPLACEMENT SENSITIVE OR
MEASURING DEVICES
Rolf Edmund Spencer, 91 Argyle Road,
West Ealing, London, England
Filed Apr. 9, 1963, Ser. No. 271,656
Claims priority, application Great Britain, Apr. 13, 1962,
14,292/62
9 Claims. (Cl. 318—18)

This invention relates to displacement sensitive or measuring devices and relates especially, though not exclusively, to such devices embodied in apparatus for automatically controlling the position of one part relative to another in response to electrical command signals.

Various proposals have been made for the construction of apparatus for automatically controlling machine tools in such a way that the worktable of the machine can be positioned automatically relative to the tool head in response to an electrical command signal. In such apparatus it is normally necessary to provide a displacement measuring or sensitive device which produces or influences one or more electrical signals depending upon the relative displacement of the table and the tool head. One form of displacement measuring device suitable for this purpose comprises a long scale extending over the full range of travel of the table or tool head, the scale being provided with a zig-zag conductor comprising a series of relatively closely spaced parallel limbs substantially perpendicular to the direction of the relative displacement, these limbs being joined together in zig-zag fashion so that current flowing in the conductor flows upward in one limb and downward in the next limbs. The device further comprises a slide, on which are provided two further zig-zag conductors like those on the scale, but relatively much shorter. The scale is parallel to and overlies the slide close thereto so that the conductors on the slide are inductively coupled with the conductor on the scale. The pitch of the limbs of the slide conductors is substantially the same as that of the pitch of the limbs of the scale conductors and the two slide conductors are in space quadrature relationship one relative to the other so that if the limbs of one of the slide conductors are aligned exactly with a set of the limbs on the scale conductor, the limbs on the other slide conductor are displaced by 90° with respect to the corresponding set of limbs on the scale conductor, twice the pitch of the limbs of the various conductors being taken to be a cycle of 360°.

A device of this kind is sensitive to relative displacement between the slide and the scale within any one cycle of the scale conductor, and if the two slide conductors are fed respectively with alternating currents of which the amplitudes are respectively proportional to sin $\theta$ and cos $\theta$, the current induced by inductive coupling in the scale conductor has a minimum when the relative displacement between the slide and the scale is proportional to $\theta$, within the respective cycle. The current induced in the scale conductor is therefore apt to be an error signal for the servo motor producing the relative displacement. It will be understood of course that the device described can only determine relative displacement within a particular cycle, and a coarse measuring device is needed to determine the desired position to the nearest cycle.

A position sensitive or measuring device such as described in the preceding paragraph has the disadvantage that the signals which have to be synthesises for the slide conductors are not linear functions of the displacement which has to be produced, and this gives rise to a need for relatively complicated synthesising circuits.

The object of the present invention is to provide an improved displacement sensitive or measuring device which although employing reactive coupling between cyclic conductor portions is nevertheless substantially linear with respect to the command signals.

According to one aspect of the present invention there is provided a displacement sensitive or measuring device comprising a scale having cyclic conductor portions, and a slide having a plurality of groups of cyclic conductor portions in reactive coupling relationship with the cyclic conductor portions of the scale, said groups of cyclic conductor portions comprising at least $n$ such groups (where $n$ is greater than three) phase displaced one group relative to the next group by approximately $180°/n$ in terms of cycles of the conductor portions of the scale, the arrangement of the groups of conductor portions of the slide being such that when an alternating current of selected amplitude is applied to a selected one of said $n$ groups and alternating currents of mutually equal amplitudes are applied respectively to the others of said $n$ groups, the resultant alternating signal in the cyclic conductor portions of the scale has a minimum amplitude when the slide and scale are relatively displaced by an amount which is substantially linearly related to said selected amplitude within limits of $$\pm 180°/2n$$

about an angle determined by the currents applied to the others of said $n$ groups.

According to a preferred form of the invention, the slide has five groups of conductor portions which groups are phase displaced by 36° one from another.

According to another aspect of the present invention there is provided a displacement sensing or measuring arrangement, comprising a scale having cyclic conductor portions, a slide having a plurality of groups of cyclic conductor portions in reactive coupling relationship with the cyclic conductor portions of the scale, the groups of cyclic conductor portions of the scale comprising at least $n$ such groups (where $n$ is greater than three) phase displaced one group relative to the next group by equal angles in terms of a cycle of the conductor portions of the scale, selected means for applying electrical oscillations of selected amplitude and polarity to a selection of said $n$ groups, and for applying electrical oscillations of the same amplitude to others of said group of conductors, and means responsive to the amplitude of the resultant oscillation induced in the cyclic conductor portions of the scale the amplitude of said resultant oscillation tending to a minimum when the slide and scale are relatively displaced by an amount substantially linearly related to said selected amplitude about an angle determined by the oscillations applied to the others of said $n$ groups.

In order that the present invention may be clearly understood and readily carried into effect, it will now be more fully described with reference to the accompanying drawings, in which:

FIGURE 1 illustrates diagrammatically a position control apparatus embodying one example of the displacement sensitive or measuring device in accordance with the present invention, FIGURE 2 is a vector diagram which is explanatory of the operation of FIGURE 1, and FIGURE 3 comprises a table which illustrates how the device embodied in the apparatus illustrated in FIGURE 1 operates linearly in successive parts of the displacement cycle.

Referring to the drawing, the reference 1 denotes the scale of the displacement sensitive device embodied in the apparatus. The apparatus forms part of automatic control mechanism for a machine tool and the scale 1 is attached to the table of the machine so as to move therewith. The scale has an adhering zig-zag conductor 2 composed of many parallel limbs which are perpendicular to the direction of movement of the table. The pitch of the limbs, that is the distance between the centre of the adjacent limbs, may be $\frac{1}{20}''$, so that one cycle of 360° of the scale is $\frac{1}{10}''$. The alternating current flowing in the zig-zag conductor 2 is fed as indicated to a power amplifier 3 the output of which controls the servo motor 4 in known manner, the servo motor 4 driving a lead screw 5 for producing displacement of the table, and with it the scale. Further in the apparatus being described the tool head is fixed, relative to the bed of the machine, and the displacement sensitive device is provided with a scale 6 which is also fixed relative to the bed of the machine. For convenience of illustration the slide 6 is shown in the drawing at the side of the scale 1, but in practice the slide and scale are parallel, face to face, and so close that the slide and scale conductors are in inductive coupling relationship. The slide is provided with five adhering zig-zag conductors, the parallel limbs of which have the same pitch as those on the scale 1. The five slide conductors are denoted respectively by the reference W1 to W5, and in the drawing each slide conductor is illustrated as consisting of two cycles although it will be understood that in practice this number would be greater. Each slide conductor is however short relative to the scale conductor. The slide conductors W1 to W5 are phase displaced one relative to the next by 36°, so that if the conductor W1 has its limb registered and in phase with a set of limbs on the slide conductor 2, the scale conductor W2 is 36° out of phase, the slide conductor W3 is 72° out of phase, and so on as denoted in the drawing. The windings W1 to W5 are connected at one end to a common earth point, and at the other end to respective selectors S1 to S5. Each of the selectors is a three position selector. Thus S1 can engage any one of three contacts C11, C12 and C13, the selector S2 can engage any one of the three contacts C21, C22 and C23, and so on for the other selectors as indicated.

The contacts C11, C21 ... C51 are joined together and connected as shown to the ungrounded terminal of a source of alternating current of reference amplitude, this current being denoted as +I. Similarly, the contacts C13 ... C53 are connected together to the ungrounded terminal of another source of alternating current of reference amplitude but of opposite phase from the current of the source 7. The current from the source 8 is therefore denoted as —I. The remaining contacts C12 ... C52 are connected to one end of an autotransformer 10, the other end of this autotransformer being grounded as shown. The autotransformer is divided into ten equal sections by eleven taps T0 to T10 and any one of these ten taps may be selectively engaged by a selector S6, which is connected as shown to one terminal of a third source 11 of an alternating current +2I, that is a current of the same phase as that from the source 7 and of twice the amplitude. The other terminal of the source 11 is connected as shown to a further selector S7 which can be moved to engage any one of eleven further equispaced taps T0 to T10, symmetrically positioned relative to T5 and covering a range equal to one of the sections between the taps T0 to T10. With this arrangement it is possible to feed to any one of the windings W1 to W5 an alternating current of one of a hundred equally spaced amplitudes in the range —I to +I, the 10th part of the amplitude being determined by the position of the selector S6, and the subdivision of this 10th part by the position of the selector S7.

In order to operate the apparatus illustrated, so as to determine a particular displacement within one cycle of the scale conductor 2, all but one of the selectors S1 ... S5 are set either to the first or the third of the contacts with which they co-operate, so that all but one of the windings W1 to W5 are fed to alternating currents of equal amplitude and different, if at all, only in the sense of the current. A selected one of the selectors S1 to S3 is moreover set to the middle one of the contacts with which it co-operates, and the selectors S6 to S7 are adjusted to determine the amplitude and sense of the alternating current fed to that selective winding.

The selectors S1 to S7 may be set automatically in response to record reading mechanism, designed for example to read out punched paper tape. Alternatively the selectors S1 to S5 may be connected by suitable gearing to the control knobs of a dial box, in such a way that a desired position may be set up manually for example on a decimal scale of linear measure. In the drawing, selectors S1 to S7 are set in such a way that the windings W1 and W2 are traversed by the alternating current +I, the winding W3 has no current in it, and the windings W4 and W5 are traversed by an alternating current of amplitude —I. The currents give rise to an alternating flux which links with the conductor 2 on the scale 1, and induces a current in the conductor 2, the phase and amplitude of which corresponds to the vector sum of the currents in the windings W1 to W5. With the setting of the selectors shown in the drawing, the currents in the windings W1, W2, W4 and W5 can be represented by the vectors V1, V2, V4 and V5 shown in FIGURE 2, each of these vectors having amplitude I. Since there is no current in the winding W3, there is no corresponding current vector. The resultant of the vectors V1, V2, V4 and V5 is a vector VR having a phase angle of —18°, as indicated in FIGURE 3, and therefore the action of the servo motor will tend to displace the scale 1 in such a way as to produce minimum coupling with this vector. Such minimum coupling will occur when the scale is in phase quadrature relationship with the vector VR, namely 72°. This it will be noticed corresponds to the scale being in phase with that one of the windings coupled to the autotransformer 10. By adjusting the selectors S6 and S7, without altering the position of the selectors S1 to S5, the current applied to the winding W3 can be varied, as aforesaid, within the limits —I and +I and this has the effect of adding a vector V3 to the vectors V1, V2, V4 and V5 which rotates the resultant vector VR, within the limits of phase angles of the vectors V1 and V5. Moreover it can be shown that when the five windings W1 to W5 have phase displacements of 36° one relative to the next, the rotation of the vector VR is linearly related to the variations in amplitude of the vector V3 to an accuracy of better than one part in a hundred. The particular positions of the selectors S1 to S5 shown in the drawing only allows the relative displacement of the scale 1 and the slide 6 to be determined within a 36° part of one cycle of the scale conductor 2. However, by adjusting the selectors S1 to S5 to energise the windings W1 to W5 in accordance with the values which are tabulated on FIGURE 3, it is evident that the relative positions of the scale 1 and the slide 6 can be determined within any part of a cycle, so that the apparatus which is illustrated in FIGURE 1 enables the relative position of 1 and 6 to be determined with an accuracy greater than 10,000th of an inch. The ranges of angles at the top of the table in FIGURE 3 are those for the resultant vector VR. The relative displacement of the scale 1 differs by +90° from the angle of the resultant vector. The apparatus illustrated would of course normally be associated with a coarse positioning device capable of determining the relative position of the scale 1 and the slide 6 to an accuracy of within one cycle.

It will be appreciated that the input signals for the displacement sensitive or measuring device comprises three digits, the first digit determining the adjustment of the selectors S1 to S5, the second determining the adjustment of the selector S6 and the third the adjustment of the selector S7.

It will be understood that the servo motor which responds to the signal generated in the conductor 2 of the scale which may be employed to displace not the part to which the scale is attached but the part to which the slide is attached. Moreover, the current sources 7 and 11 which are shown separate may in fact have common elements. Other modifications of a practical character may also be made to the apparatus illustrated.

For example the scale and slide conductors may be helically wound on separate cylinders instead of being zig-zag conductors on plane surfaces. Moreover the coupling between the scale and slide conductors may be capacitive and in some cases the cycle portions of the various conductors need not be connected together in succession as in the example illustrated.

Either the scale or the slide of the device may be movable.

In the example illustrated, the phase displacement of one slide conductor relative to the next is $180°/n$ and there are five such conductors. This, coupled with the polarities of the currents fed to four of the five slide conductors, causes the vector V3, or the vector due to the current on the "selected" one of the five conductors, to be at right angles to the resultant vector VR due to the currents in the four other slide conductors. Thus the current in the selected conductor (say W3) swings the direction of the resultant vector from the VR direction through an angle $\theta$ of which the tangent is $V3/VR$. The amplitude of VR is constant and the angle $\theta$ is only used (for any one position of the selectors S1 to S5) within a range of $\pm 18°$.

If $\theta/18°$ is denoted as $x$, it can be shown that the error introduced in assuming that $\theta$ is linearly proportional to V3 is the difference between $$\frac{\tan 18x°}{\tan 18°}$$

and $x$. This is greatest when $18x$ equals about $10.3°$ and the difference is then 1.3% of 18° and is better than 1% of the range of 36°.

The number of conductors, or groups of cyclic conductor portions on the slide may differ from five but should not be less than four to maintain tolerable linearity relative to the current in the selected conductor or group of cyclic conductor portions of the slide.

The use of currents of positive and negative polarities may be avoided by doubling the number of slide conductors of groups of cyclic conductor portions, and appropriately modifying the selectors.

What I claim is:

1. A displacement sensitive or measuring device comprising a scale having cyclic conductor portions, and a slide having a plurality of groups of cyclic conductor portions in reactive coupling relationship with the cyclic conductor portions of the scale said groups of cyclic conductor portions comprising at least $n$ such groups (where $n$ is greater than three) phase displaced one group relative to the next group by approximately $180°/n$ in terms of cycles of the conductor portions of the scale, the arrangement of the groups of conductor portions of the slide being such that when an alternating current of selected amplitude is applied to a selected one of said $n$ groups and alternating currents of mutually equal amplitudes are applied respectively to the others of said $n$ groups, the resultant alternating signal in the cyclic conductor portions of the scale has a minimum amplitude when the slide and scale are relatively displaced by an amount which is substantially linearly related to said selected amplitude within limits of $\pm 180°/2n$ about an angle determined by the currents applied to the others of said $n$ groups.

2. A device according to claim 1 where $n$ is five and the respective groups of conductor portions are phase displaced by 36° whereby the device is adapted to operate on a scale of ten.

3. A device according to claim 1 wherein said cyclic conductor portions of the scale are joined to form a zigzag conductor, and each of said groups of conductor portions of the slide are joined to form an individual zigzag conductor in inductive coupling relationship with the zig-zag conductor of the scale.

4. A displacement sensing or measuring arrangement comprising a scale having cyclic conductor portions, a slide having a plurality of groups of cyclic conductor portions in reactive coupling relationship with the cyclic conductor portions of the scale, the groups of cyclic conductor portions of the scale comprising at least $n$ such groups (where $n$ is greater than three) phase displaced one group relative to the next group by equal angles in terms of a cycle of the conductor portions of the scale, selector means for applying electrical oscillations of selected amplitude and polarity to a selection of said $n$ groups and for applying electrical oscillations of the mutually equal amplitudes to others of said groups of conductors, and means responsive to the amplitude of the resultant oscillation induced in the cyclic conductor portions of the scale, the amplitude of said resultant oscillations tending to a minimum when the slide and scale are relatively displaced by an amount substantially linearly related to said selected amplitude about an angle determined by the oscillations applied to the others of said $n$ groups.

5. An arrangement according to claim 4 wherein said $n$ groups are phase displaced by approximately $180°/n$, and said selector means including means for selecting the polarities of the oscillations applied respectively to the others of said $n$ groups.

6. An arrangement according to claim 5 wherein $n$ is five.

7. An arrangement according to claim 4 wherein said cyclic conductor portions of the scale are joined to form a continuous conductor, and each of said groups of conductor portions of the slide are joined to form a respective continuous conductor.

8. An arrangement according to claim 4, embodied in position control apparatus wherein said means responsive to the amplitude of the resultant oscillation in the cyclic conductor portions of the scale comprises a servo motor for relatively positioning said scale and said slide so as to tend to reduce the amplitude of said resultant oscillation.

9. A machine tool embodying position control apparatus according to claim 8.

No references cited.

JOHN F. COUCH, *Primary Examiner.*